(12) United States Patent
Christiansson et al.

(10) Patent No.: US 9,811,209 B2
(45) Date of Patent: Nov. 7, 2017

(54) TOUCH DETERMINATION WITH IMPROVED DETECTION OF WEAK INTERACTIONS

(71) Applicant: FlatFrog Laboratories AB, Lund (SE)

(72) Inventors: Tomas Christiansson, Torna-Hallestad (SE); Nicklas Ohlsson, Bunkeflostrand (SE)

(73) Assignee: FLATFROG LABORATORIES AB, Lund (SE)

( * ) Notice: Subject to any disclaimer, the term of this patent is extended or adjusted under 35 U.S.C. 154(b) by 462 days.

(21) Appl. No.: 14/380,063

(22) PCT Filed: Feb. 19, 2013

(86) PCT No.: PCT/SE2013/050137
§ 371 (c)(1),
(2) Date: Aug. 20, 2014

(87) PCT Pub. No.: WO2013/126005
PCT Pub. Date: Aug. 29, 2013

(65) Prior Publication Data
US 2016/0070415 A1  Mar. 10, 2016

Related U.S. Application Data

(60) Provisional application No. 61/601,114, filed on Feb. 21, 2012.

(30) Foreign Application Priority Data

Feb. 21, 2012 (SE) .................................. 1250150

(51) Int. Cl.
  *G06F 3/042* (2006.01)
  *G06F 3/041* (2006.01)

(52) U.S. Cl.
CPC ......... *G06F 3/0421* (2013.01); *G06F 3/0418* (2013.01); *G06F 2203/04104* (2013.01); *G06F 2203/04109* (2013.01)

(58) Field of Classification Search
None
See application file for complete search history.

(56) References Cited

U.S. PATENT DOCUMENTS 6,784,948 B2 *  8/2004  Kawashima ........ G02F 1/13338
                                                                            178/18.05
6,972,753 B1  12/2005  Kimura et al.
(Continued)

FOREIGN PATENT DOCUMENTS

WO  WO-2009/048365 A1   4/2009
WO  WO-2009/135320 A1  11/2009
(Continued)

OTHER PUBLICATIONS

Barzilai, Jonathan and Jonathan M. Borwein. "Two-Point Step Size Gradient Methods." *IMA Journal of Numerical Analysis* (1988) 8, 141-148.
(Continued)

*Primary Examiner* — Seokyun Moon
(74) *Attorney, Agent, or Firm* — Harness, Dickey & Pierce, P.L.C.

(57) ABSTRACT

Touch sensitivity is enabled using a touch system that comprises a panel configured to conduct signals, e.g. by TIR, along detection lines across a touch surface. A signal processor operates to obtain observed values for the detection lines, and identify an interaction pattern on the touch surface as a solution to an optimization function that comprises an aggregation of differences, for each detection line, between the observed value and a projected value, which is given by a projection function that defines a functional relation between the interaction pattern and the projected value for
(Continued)

each detection line. The signal processor implements a normalization to ensure that the interaction pattern indicates weak touches even in the presence of strong touches. The normalization involves computing a respective normalization value for each of the differences as a function of the observed value for the respective detection line; and applying the respective normalization value so as to normalize the respective difference in the optimization function.

20 Claims, 4 Drawing Sheets

(56) References Cited

U.S. PATENT DOCUMENTS

| | | | |
|---|---|---|---|
| 7,432,893 B2 | 10/2008 | Ma et al. | |
| 7,465,914 B2* | 12/2008 | Eliasson | G06F 3/0414 250/221 |
| 8,436,833 B2 | 5/2013 | King et al. | |
| 8,482,547 B2 | 7/2013 | Christiansson et al. | |
| 2004/0252091 A1* | 12/2004 | Ma | G06F 3/0421 345/87 |
| 2006/0114237 A1 | 6/2006 | Crockett et al. | |
| 2007/0075648 A1 | 4/2007 | Blythe et al. | |
| 2008/0062150 A1* | 3/2008 | Lee | G06F 3/0416 345/175 |
| 2008/0158176 A1 | 7/2008 | Land et al. | |
| 2009/0135162 A1* | 5/2009 | Van De Wijdeven | G06F 3/0421 345/175 |
| 2009/0153519 A1* | 6/2009 | Suarez Rovere | G06F 3/0421 345/173 |
| 2009/0267919 A1* | 10/2009 | Chao | G06F 3/0421 345/175 |
| 2009/0273794 A1* | 11/2009 | Ostergaard | G02B 6/0016 356/614 |
| 2009/0278795 A1 | 11/2009 | Hansen et al. | |
| 2011/0037735 A1 | 2/2011 | Land et al. | |
| 2011/0069039 A1* | 3/2011 | Lee | G06F 3/0425 345/176 |
| 2011/0090176 A1 | 4/2011 | Christiansson et al. | |
| 2011/0122091 A1 | 5/2011 | King et al. | |
| 2011/0227874 A1* | 9/2011 | Fahraeus | G06F 3/0421 345/175 |
| 2012/0154339 A1 | 6/2012 | Land et al. | |
| 2012/0162142 A1 | 6/2012 | Christiansson et al. | |
| 2012/0162144 A1* | 6/2012 | Fahraeus | G06F 3/0418 345/178 |
| 2012/0169672 A1* | 7/2012 | Christiansson | G06F 3/0421 345/175 |
| 2012/0200538 A1* | 8/2012 | Christiansson | G06F 3/0418 345/175 |
| 2012/0212441 A1 | 8/2012 | Christiansson et al. | |
| 2012/0268403 A1 | 10/2012 | Christiansson | |

FOREIGN PATENT DOCUMENTS

| | | |
|---|---|---|
| WO | WO-2010/006882 A2 | 1/2010 |
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/064983 A2 | 6/2010 |
| WO | WO-2010/134865 A1 | 11/2010 |
| WO | WO-2011/028170 A1 | 3/2011 |
| WO | WO-2011/049511 A1 | 4/2011 |
| WO | WO-2011/049513 A1 | 4/2011 |

OTHER PUBLICATIONS

Press, William H. et al. *Numerical Recipes: The Art of Scientific Computing* (Third Edition): Cambridge University Press, 1988.
International Search Report and Written Opinion dated Oct. 15, 2013 issued in corresponding International Application No. PCT/SE2013/050137.
Gene H Golub et al: "Matrix Norms" in: "Matrix Computations" Aug. 21, 2005 (Aug. 21, 2005), Johns Hopkins University Press, pp. 54-59.
Andreas HolzammerL "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis_Andreas_holzammer.pdf * p. 27, line 1-p. 31*.
Alan C Horwood et al: "Image Normalization, a Basic Requirment for Comupter-based Automatic Diagnostic Applications", May 1, 2001 (May 1, 2001), retreived from the Internet: URL:http://facweb.cs.depaul.edu/research/vc/seminar/Paper/Feb22_2008Emili_ImageNormalization.pdf *p. 9, line 1-p. 14, line 1*.
Supplemental ESR dated Aug. 20, 2015 issued in corresponding EP Appin No. 13752508.

* cited by examiner

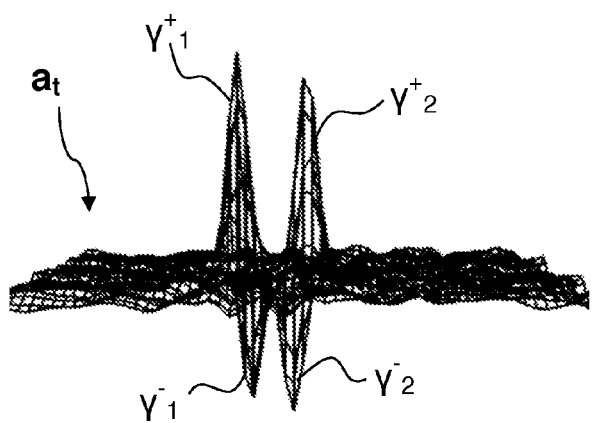
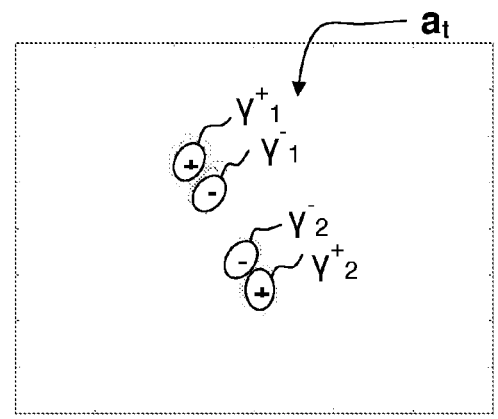
Fig. 3A
Fig. 3B
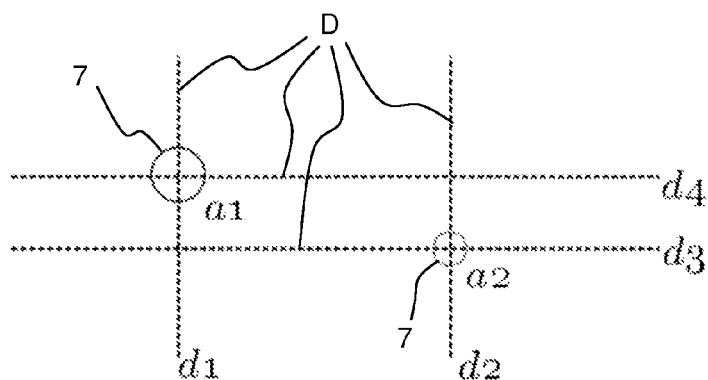
Fig. 4A
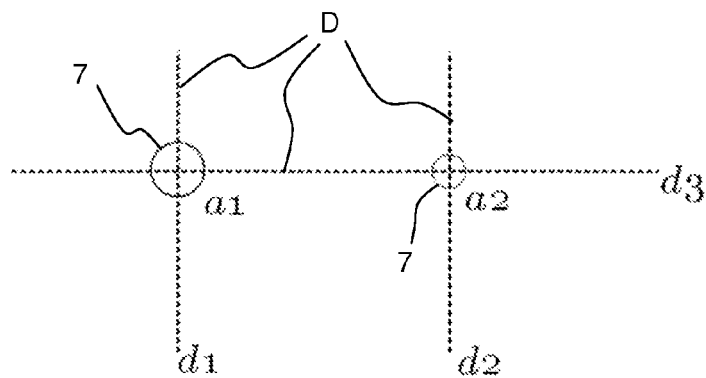
Fig. 4B

TOUCH DETERMINATION WITH IMPROVED DETECTION OF WEAK INTERACTIONS

CROSS-REFERENCE TO RELATED APPLICATIONS

The present application is the National Phase of International Application No. PCT/SE2013/050137, filed 19 Feb. 2013, which claims priority to Swedish patent application No. 1250150-8, filed 21 Feb. 2012, and U.S. provisional application No. 61/601,114, filed 21 Feb. 2012, both of which are incorporated herein by reference.

TECHNICAL FIELD

The present invention relates to touch sensing systems and data processing techniques in relation to such systems.

BACKGROUND ART

Touch sensing systems ("touch systems") are in widespread use in a variety of applications. Typically, the touch sensing systems are actuated by a touch object such as a finger or stylus, either in direct contact or through proximity (i.e. without contact) with a touch surface. Touch sensing systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2010/064983 and WO2010/06882 disclose another type of multi-touch system which is based on frustrated total internal reflection (FTIR). Light sheets are coupled into a panel to propagate inside the panel by total internal reflection. When an object comes into contact with a touch surface of the panel, two or more light sheets will be locally attenuated at the point of touch. Arrays of light sensors are located around the perimeter of the panel to detect the received light for each light sheet. Data from the light sensors may be processed into logarithmic transmission values, which are input into an image reconstruction algorithm that generates a two-dimensional (2D) distribution of attenuation values over the touch surface. This enables determination of shape, position and size of multiple touches.

The prior art also comprises WO2011/049511 which proposes image reconstruction based on the use of a projection function that models the impact on the received light when a touching object interacts with the light that propagates on different paths (detection lines) across the touch surface. The projection function defines a functional relation between projected values for the detection lines and a 2D distribution of attenuation values across the touch surface. The 2D distribution is generated by finding an optimum of an optimization function that includes an aggregation of absolute differences between projected values, given by the projection function, and observed values for the different detection lines. The optimization function may be obtained by Bayesian inversion.

Irrespective of sensor technology, the touches need to be detected against a background of measurement noise and other interferences, e.g. originating from ambient light, fingerprints and other types of smear on the touch surface, vibrations, detection artifacts, etc. The influence of measurement noise and interferences may vary not only over time but also within the extent of the touch surface, making it difficult to properly detect the touches on the touch surface at all times. Furthermore, the degree of interaction between a touching object and the touch surface may vary both over time and between different objects. For example, the interaction may depend on if an object is tapped, dragged or held in a fixed position onto the touch surface. Different objects may yield different degree of interaction, e.g. the degree of interaction may vary between fingers of a user, and even more so between the fingers of different users.

The combination of several touches, complex gestures as well as temporal and spatial variations in degree of interaction, background, and noise will make the identification of touches a more demanding task. The user experience will be greatly hampered if, e.g., an ongoing gesture on a touch screen is interrupted by the system failing to detect certain touches during the gesture.

SUMMARY

It is an objective of the invention to at least partly overcome one or more limitations of the prior art.

In view of the foregoing, one objective is to enable a consistent user experience when interacting with a multi-touch system.

Another objective is to enable a consistent user experience even if the degree of interaction differs significantly between the touching objects.

One or more of these objectives, as well as further objectives that may appear from the description below, are at least partly achieved by means of a method of enabling touch determination, a computer-program product, devices for enabling touch determination and a touch-sensitive apparatus according to the independent claims, embodiments thereof being defined by the dependent claims.

A first aspect of the invention is a method of enabling touch determination based on an output signal from a touch-sensitive apparatus. The touch-sensitive apparatus comprises a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal which is indicative of interaction between one or more touching objects and one or more of the detection lines. The method comprises the steps of: receiving the output signal; processing the output signal to obtain observed values for the detection lines; and identifying an interaction pattern for the surface portion as a solution to an optimization function that comprises an aggregation of differences between the observed value and a projected value for each of the detection lines, the projected value being given by a projection function that defines a functional relation between the interaction pattern and the projected value for the respective detection line. The method further comprises the steps of: computing a respective normalization value for each of the differences as a function of the observed value for the respective detection line; and applying the respective normalization value so as to normalize the respective difference in the optimization function.

The first aspect includes a normalization procedure that improves the ability of the interaction pattern to indicate weakly interacting objects in the presence of strongly interacting objects. In the absence of the normalization procedure, the solution to the optimization function may tend to omit or at least suppress interaction structures that originate from a weakly interacting object in the presence of a strongly interacting object, e.g. when both objects happen to interact with the same detection line. Thereby, the first aspect may provide an improved ability of multi-touch detection, which may be exploited to improve the user experience.

In one embodiment, the respective normalization value is computed to be relatively larger when the observed value corresponds to a strong interaction compared to a weak interaction.

In one embodiment, the interaction pattern is generated to indicate changes in interaction on the surface portion, and the respective normalization value is computed as a function of a nominal difference between the observed value for the respective detection line and a nominal projected value for the respective detection line, the nominal projected value being given by the projection function when the interaction pattern indicates that there are no changes in interaction on the surface portion.

In one embodiment, the respective normalization value is computed as a function of a positive offset value and the nominal difference.

In one embodiment, the step of computing the respective normalization value comprises adding a positive offset value to a non-negative value obtained as a function of the nominal difference.

In one embodiment, the positive offset value is set to exceed an estimated noise level of the output signal.

In one embodiment, the step of estimating the interaction pattern comprises: finding the solution that causes a gradient of the optimization function for each interaction value in the interaction pattern to be essentially zero.

In one embodiment, the optimization function comprises a first part that represents a likelihood distribution, which is a function of the aggregation of differences, and a second part that represent a prior distribution, which is configured to penalize variations between neighboring interaction values in the interaction pattern.

In one embodiment, the prior distribution is a function of an aggregation of second differences between each individual interaction value in the interaction pattern and its neighboring interaction values in the interaction pattern, wherein each of the second differences is normalized by a respective second normalization value that represents a local interaction strength at said individual interaction value.

In one embodiment, the local interaction strength is computed as a function of said individual interaction value.

In one embodiment, the second normalization value is computed by adding a positive second offset value to the local interaction strength.

In one embodiment, the positive second offset value is set to exceed an estimated noise level in the interaction pattern.

In one embodiment, the step of processing the output signal comprises identifying a measurement value for each detection line, and generating the observed value to represent a relative change of the measurement value to a reference value for the respective detection line. In one implementation, the observed value are given as a logarithm of the relative change.

In one embodiment, the reference value for the respective detection line is computed as a function of the measurement value for the detection line in the output signal at a calibration time without said interaction between said one or more touching objects and said one or more of the detection lines.

In one embodiment, the method operates in a sequence of repetitions to identify the measurement value for each detection line, generate the observed values for the detection lines, and estimate the interaction pattern, wherein the reference value for the respective detection line is intermittently updated based on the output signal such that the interaction pattern indicates changes in interaction with respect to a preceding repetition in the sequence of repetitions.

In one embodiment, the interaction pattern is representative of changes in one of attenuation and transmission.

A second aspect of the invention is a computer program product comprising computer code which, when executed on a data-processing system, is adapted to carry out the method according to the first aspect.

A third aspect of the invention is a device for enabling touch determination based on an output signal from a touch-sensitive apparatus. The device comprises: an input for receiving the output signal, and a signal processor configured to receive the output signal; process the output signal to obtain observed values for the detection lines; and identify an interaction pattern for the surface portion as a solution to an optimization function that comprises an aggregation of differences between the observed value and a projected value for each of the detection lines, the projected value being given by a projection function that defines a functional relation between the interaction pattern and the projected value for the respective detection line. The signal processor is further configured to: compute a respective normalization value for each of the differences as a function of the observed value for the respective detection line; and apply the respective normalization value so as to normalize the respective difference in the optimization function.

A fourth aspect of the invention is a device for enabling touch determination based on an output signal from a touch-sensitive apparatus. The device comprises: means for receiving the output signal; means for processing the output signal to obtain observed values for the detection lines; and means for identifying an interaction pattern for the surface portion as a solution to an optimization function that comprises an aggregation of differences between the observed value and a projected value for each of the detection lines, the projected value being given by a projection function that defines a functional relation between the interaction pattern and the projected value for the respective detection line. The device further comprises: means for computing a respective normalization value for each of the differences as a function of the observed value for the respective detection line; and means for applying the respective normalization value so as to normalize the respective difference in the optimization function.

A fifth aspect of the invention is a touch-sensing apparatus, comprising: a panel configured to conduct signals from a plurality of incoupling points to a plurality of outcoupling points, thereby defining detection lines that extend across a surface portion of the panel between pairs of incoupling and outcoupling points; means for generating the signals at the incoupling points; means for generating an output signal based on detected signals at the outcoupling points; and the device according to the third or fourth aspect.

Any one of the above-identified embodiments of the first aspect may be adapted and implemented as an embodiment of the second to fifth aspects to attain the corresponding technical advantages and effects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 3A-3B are plots of an attenuation pattern indicating short-term changes in attenuation.

FIG. 4A illustrates, in a simplified geometry, the detection lines that are affected by two touching objects, at a first time point, and FIG. 4B corresponds to FIG. 4A but is given at a second time point.

DETAILED DESCRIPTION OF EXAMPLE EMBODIMENTS

Figure 1A:
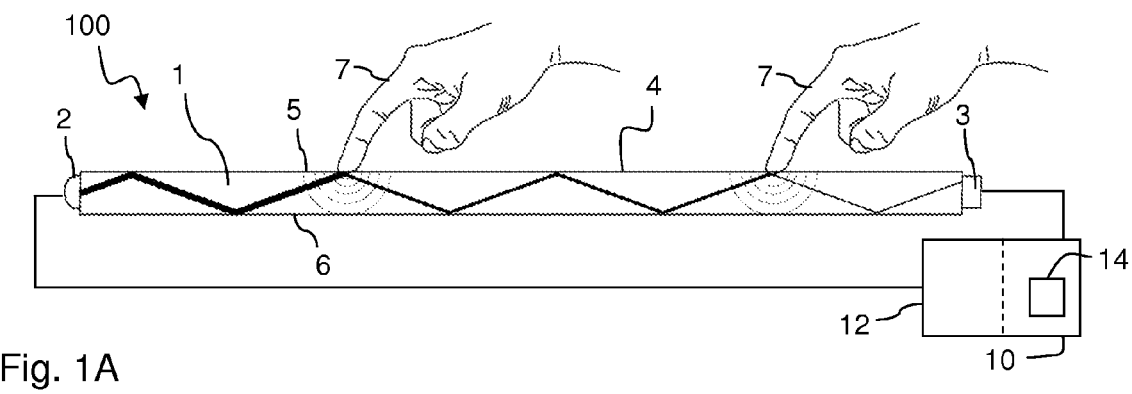
FIGS. 1A-1B are section and top plan views of exemplifying touch-sensing FTIR systems.

Below follows a description of example embodiments of a technique for enabling extraction of touch data for objects in contact with a touch surface of a touch-sensitive apparatus. Throughout the following description, the same reference numerals are used to identify corresponding elements. Further, bold characters are used to indicate vectors/matrices, while non-bold characters are used to indicate individual parameters/values.

1. Touch-sensitive Apparatus

Figure 1B:
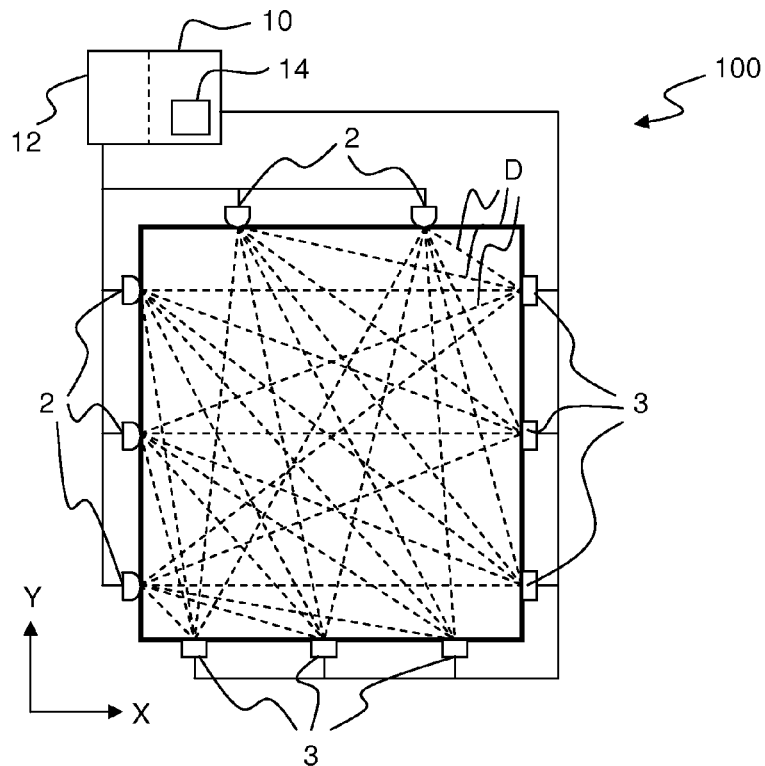

Embodiments of the invention relate to signal processing in relation to a touch-sensitive apparatus which is based on the concept of transmitting energy of some form across a touch surface, such that an object that is brought into close vicinity of, or in contact with, the touch surface causes a local decrease in the transmitted energy. The apparatus may be configured to permit transmission of energy in one of many different forms. The emitted signals may thus be any radiation or wave energy that can travel in and across the touch surface including, without limitation, light waves in the visible or infrared or ultraviolet spectral regions, electrical energy, electromagnetic or magnetic energy, or sonic and ultrasonic energy or vibration energy. Example embodiments of the invention will be described in relation to a touch-sensitive apparatus 100, which is shown in FIGS. 1A-1B and is based on detecting interaction between touching objects and light that propagates by total internal reflection inside a light transmissive panel. This interaction is generally referred to as FTIR (Frustrated Total Internal Reflection), and the apparatus 100 is therefore also denoted "FTIR system" herein. The apparatus 100 operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1A, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought in contact with the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or, equivalently, power or intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. In the example of FIG. 1B, each emitter 2 generates a beam of light that expands in the plane of the panel 1 while propagating in the panel 1. Each beam propagates from one or more entry or incoupling points (ports) on the panel 1. The detectors 3 are distributed along the perimeter of the touch surface 4 to receive the light from the emitters 2 at a number of spaced-apart outcoupling points (ports) on the panel 1. It should be understood that the incoupling and outcoupling points merely refer to the position where the beam enters and leaves, respectively, the panel 1. Thus, although not shown in FIG. 1B, one emitter/detector may be optically coupled to a number of incoupling/outcoupling points.

The detectors 3 collectively provide an output signal, which is received and sampled by a signal processor 10. The output signal contains a number of sub-signals, also denoted "measurement signals", each representing the energy of light emitted by a certain light emitter 2 and received by a certain detector 3. Depending on implementation, the signal processor 10 may need to process the output signal for separation of the individual measurement signals. Conceptually, the touch apparatus 100 is considered to define a grid of detection lines D on the touch surface 4, where each detection line D corresponds to a light propagation path from an emitter 2 to a detector 3, as projected onto the touch surface 4. Thus, the measurement signals represent the received energy/power/intensity of light on the individual detection lines D. It is realized that the touching object 7 results in a decrease (attenuation) of the received energy on one or more detection lines D. In the following, the measurement values for all detection lines at time point t are collectively represented by $I_t$.

As will be explained below, the signal processor 10 may be configured to process the measurement signals so as to determine a distribution of attenuation values (for simplicity, referred to as an "attenuation pattern") across the touch surface 1, where each attenuation value represents a local attenuation of light. The attenuation pattern may be represented in many different ways, e.g. as attenuation values arranged in a regular x-y-grid, such as in an ordinary digital image, although other types of grids are conceivable, e.g. hexagonal patterns or triangular meshes. Irrespective of implementation, the attenuation pattern may be seen to define a number of positions or cells with a respective attenuation value. The attenuation pattern may be further processed by the signal processor 10 or by a separate device (not shown) for touch determination, which may involve extraction of touch data, such as a position (e.g. x,y coordinates), a shape or an area of each touching object. In the following, a "frame" denotes a repeated event starting with data collection and ending with determination of touch data. By repeatedly generating the attenuation pattern and determining the touch data, it is possible to identify and track objects that interact with the touch surface.

In the illustrated example, the apparatus 100 also includes a controller 12 which is connected to selectively control the activation of the emitters 2 and, possibly, the readout of data from the detectors 3. The signal processor 10 and the controller 12 may be configured as separate units, or they may be incorporated in a single unit (as shown). One or both of the signal processor 10 and the controller 12 may be at least partially implemented by software executed by a processing unit 14.

It is to be understood that FIGS. 1A-1B merely illustrate examples of an FTIR system. For example, the detection lines may instead be generated by sweeping or scanning one or more beams of light inside the panel 1, and the light may instead be coupled into and out of the panel 1 via the top and bottom surfaces 5, 6, e.g. by the use of dedicated coupling elements attached to the panel 1. Examples of alternative FTIR systems are e.g. disclosed in U.S. Pat. Nos. 6,972,753, 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive concept may be applied to such alternative FTIR systems as well.

2. Data Formatting

Embodiments of the invention may use any available reconstruction algorithm that operates to determine a 2D attenuation pattern by fitting the attenuation pattern to observed values for the detection lines based on a projection function that physically models the signal response of each detection line to the attenuation pattern. The inventive concept will be exemplified with reference to the reconstruction technique that is described in aforesaid WO2011/049511, but may be equally applicable to certain tomographic techniques such as ART (Algebraic Reconstruction Technique) and SART (Simultaneous Algebraic Reconstruction Technique). Instead of repeating the fundamentals of this technique, the entire contents of WO2011/049511 is incorporated herein by reference. In this section, a few comments will be given with respect to the format of the observed values that are used in the reconstruction and the format of the attenuation values in the resulting attenuation pattern.

The reconstruction is based on the assumption that the observed values $d_t$ at time point t depend on the attenuation pattern, $a_t$, according to a projection function P, which reflects the properties of the physical touch system: $d_t=P(a_t)$. It is to be understood that the format of the attenuation pattern, the projection function P and the format of the observed values $d_t$ are interrelated design parameters. In the following examples, the attenuation pattern $a_t$ is a distribution of attenuation values $a_v$ that indicate a change in attenuation compared to a reference pattern at individual positions v on the touch surface.

The projection function P may be designed to model the transmission along each detection line: $T_k = e^{-\int a(x,y)dl}$, where a(x,y) is the attenuation pattern along the detection line. With such a projection function, it may be desirable to format the observed values as transmission values, which may be computed by dividing the measurement value $I_k$ of the k:th detection line by a respective reference value: $d_k = I_k/REF_k$.

In aforesaid WO2011/049511, the projection function P models a projected value $P(a)_k$ for each detection line as a sum of contributions from basis functions arranged on the touch surface:

$$P(a)_k = e^{-\int a(x,y)dl} = e^{-\Sigma_v r_{v,k} a_v},$$

where $a_v$ is the attenuation value for the v:th basis function, $r_{v,k}$ is the line integral for the k:th detection line through the v:th basis function.

To simplify the reconstruction process, it may be advantageous to format the observed values as logarithmic entities (in any base): $d_k=-\log(I_k/REF_k)$, or an approximation thereof, e.g. $d_k=1-I_k/REF_k$ (valid for $I_k/REF_k$ close to 1). In this format, each projected value $P(a)_k$ may be modeled as a straight-forward sum of the attenuation by the basis functions along the detection line: $P(a)_k = \int a(x,y)dl = -\Sigma_v r^{v,k} \cdot a_v$.

Figure 2:
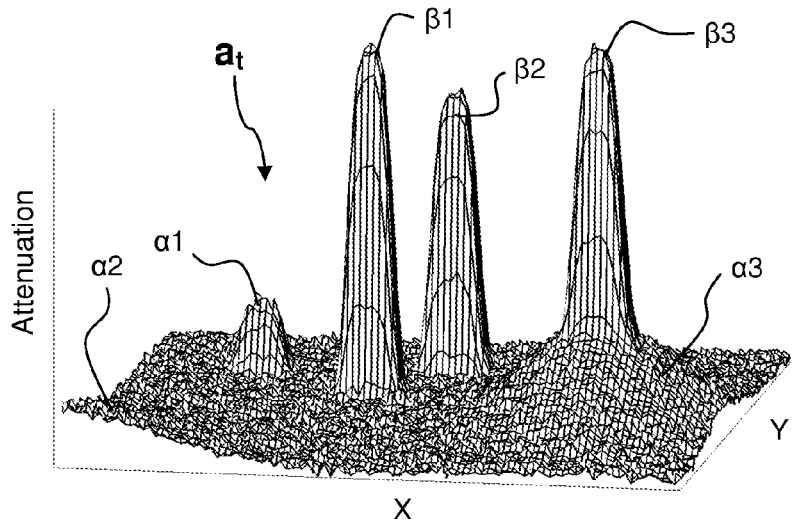
FIG. 2 is a 3D plot of an attenuation pattern indicating long-term changes in attenuation.

The choice of reference values $REF_k$ is a design parameter that will affect the time scale of the changes that are visualized in the attenuation pattern. In a first example, the reference values $REF_k$ are given by the measurement values $I_0$ at a certain calibration time point when no touching object (finger, stylus, etc) is present on the touch surface, such as when the assembly of the FTIR system is finalized, at start-up, or when a user initiates a reset operation of the FTIR system. These reference values may be stored in a memory unit of the device, e.g. as $I_0$ or $\log(I_0)$. By converting the measurement values $I_t$ into observed values formatted as $d_t = 1-I_t/I_0$ or $d_t=-\log(I_t/I_0)=\log(I_0)-\log(I_t)$, the attenuation pattern $a_t$ may be generated to represent the change in attenuation on the touch surface since the calibration time point, where an attenuation value of zero (0) indicates no change. Such an attenuation pattern $a_t$ is illustrated in FIG. 2 as a 3D plot in the coordinate system X,Y of the touch surface (cf. FIG. 1B). The attenuation pattern $a_t$ in FIG. 2 represents the accumulated attenuation on the touch surface since the calibration time point, both from touches and contamination. In the illustrated example, the peaks β1, β2, β3 originate from fingers in contact with on the touch surface, and the structures α1, α2, α3 originate from a fingerprint from an earlier touch, smear from a palm previously resting on the touch surface, and a liquid spill, respectively.

In a second example, the reference values $REF_k$ are updated repeatedly during operation of the FTIR system, e.g. at time intervals Δt, by setting the reference values equal to the current measurement values and using the updated reference values in the next time interval. By converting the measurement values $I_t$ into observed values formatted as $d_t=1-I_t/I_{t-\Delta t}$ or $d_t=-\log(I_t/I_{t-\Delta t})=\log(I_{t-\Delta t})-\log(I_t)$, the attenuation pattern $a_t$ may be generated to represent the change in attenuation on the touch surface in the time interval Δt, where an attenuation value of zero (0) indicates no change. Depending on implementation, the time interval Δt may be set to 1 frame or plural frames, such that Δt is in the range of 5 ms-5 s. It should be realized that the attenuation pattern $a_t$ may contain both positive and negative peaks, caused by attenuation changes on the touch surface during $\Delta t$, e.g. by movement, removal or addition of touching objects. FIGS. 3A-3B illustrate, in a 3D plot and a plan view, respectively, an attenuation pattern $a_t$ containing two dipole peaks $\gamma_1^+, \gamma_1^-$ and $\gamma_2^+, \gamma_2^-$ representing two objects that are moved away from each other during $\Delta t$.

In a variation of the second example, the reference values $REF_k$ are updated to factor in measurement values from more than one time point. For example, the reference values may be given by a temporally low-pass filtered measurement value $\overline{I_{t-m}}$ or $\log(\overline{I_{t-m}})$, e.g. computed by an exponential forget filter, such as: $\overline{I_{t-m}} = \overline{I_{t-m-1}} - \epsilon \cdot (I_t \text{-m} - \overline{I_{t-m-1}})$ or $\log(\overline{I_{t-m}}) = \log(\overline{I_{t-m-1}}) - \epsilon \cdot (\log(I_{t-m}) - \log(\overline{I_{t-m-1}}))$, where $0 < \epsilon \leq 1$. It is also possible to compute $\overline{I_{t-m}}$ or $\log(\overline{I_{t-m}})$ using a moving average, or the like. In all of these examples, m denotes frames and may have any suitable number, including 0.

3. Reconstruction Processing to Handle Both Weak and Strong Touches

The above-described reconstruction technique generally involves optimizing an aggregation of differences between the observed values $d_t$ and the projected values $P(a_t)$, which are given as a function of the attenuation pattern through the projection function. As described in WO2011/049511, finding the attenuation pattern may be a task of minimizing the aggregation of differences, optionally in combination with additional constraints that are based on a priori information, i.e. prior knowledge about how the attenuation pattern normally behaves. The additional constraints may be incorporated into the optimization task as one or more so-called priors by using Bayes' theorem. However, there are implementations that allow the attenuation pattern to be determined without the use of priors.

As described in WO2011/049511, the attenuation pattern may be estimated by optimizing a probability function, which comprises one part that represents a probability model for measurement and reconstruction errors ("likelihood distribution") and another part that represents a probability model based on one or more priors ("prior distribution"). In terms of optimization, the probability function may be represented as a total optimization function: $F_{total}(a) = \alpha F_{model}(a) + \gamma F_{prior}(a)$, where $F_{model}(a)$ is the part representing the likelihood distribution, $F_{prior}(a)$ is the part representing the prior distribution, and $\alpha$ and $\gamma$ are constants that may be selected to define whether the optimization is focused on agreement with the observed values or on agreement with the prior.

As noted, the likelihood distribution and thus $F_{model}(a)$ is formed as, or at least comprises, an aggregation of differences between projected values and observed values. In the following discussion, it is presumed that $F_{model}(a)$ is given by the square of the L2-norm, i.e. $F_{model}(a) = \|P(a) - d\|_2^2$. In the absence of priors, finding the attenuation pattern is thus equal to minimizing the residual sum of squared errors (RSS). However, the underlying problem and the inventive solution is equally applicable to other definitions of $F_{model}(a)$.

As explained in the Background section, the attenuation may differ significantly between touching objects. The differences in attenuation may be caused by differing properties among the individual objects (e.g. index of refraction, wetting, degree of optical coupling to the panel, etc). Furthermore, a stationary object may yield a significantly stronger attenuation than a moving object (drag). These differences in attenuation may make it difficult for the reconstruction process to adequately represent small attenuation changes in the attenuation pattern in the presence of large attenuation changes.

This problem will be exemplified with reference to FIGS. 4A-4B which illustrate two touching objects 7 and a number of affected detection lines D, although the number of affected detection lines may be significantly larger in a real FTIR system. In this simplified example, it is presumed that the attenuation $a_1$ of one object is significantly stronger than the attenuation $a_2$ of the other object, roughly by a factor of 50, that the observed values $d_1$-$d_4$ are formatted as logarithmic transmission and are given by the sum of the attenuation of individual objects, and that the coefficients ($r_{v,k}$) in the P-matrix is either 0 or 1.

In respect of FIG. 4A, the following observed values (with noise and imperfections in the measurement system) are obtained: $[d_1=51, d_2=1, d_3=1, d_4=48]$. Minimizing the RSS yields the attenuation values: $[a_1=49.5, a_2=1]$. Thus, the reconstruction processing is capable of properly determining the attenuation of both objects.

In respect of FIG. 4B, the following observed values are instead obtained: $[d_1=51, d_2=1, d_3=49]$. Now, the observed value $d_3$ is the sum of attenuation of two objects of significantly differing attenuation. Minimizing the RSS yields the attenuation values: $[a_1=50, a_2=0]$. Clearly, the reconstruction processing incorrectly sets the attenuation value $a_2$ to zero and thereby fails to identify the weakly interacting object.

FIGS. 4A-4B illustrate that minimizing the RSS may fail to properly identify weak touches in the presence of strong touches. This may be understood by considering that the RSS, given by $\|P(a)-d\|_2^2$, puts large penalties on the absolute differences between the projected values $P(a)$ and the observed values $d$. Generally, weak touches result in much smaller absolute differences than strong touches, and weak touches will thus have a much smaller impact on the RSS than the strong touches.

According to embodiments of the invention, the likelihood distribution is modified to enhance the differences for weak touches compared to strong touches. This is achieved by modifying the aggregation of differences such that relative differences between projected values $P(a)$ and observed values $d$ are aggregated instead of absolute differences, at least when the observed values corresponds to large attenuations. As used herein, "absolute differences" refer to non-normalized differences between values, whereas "relative differences" refer to normalized differences between values. In embodiments of the invention, the aggregation of differences is modified such that each individual difference between a projected value and an observed value is normalized by a normalization value that is dependent on the respective observed value. Thereby, the aggregation is converted from an aggregation of absolute differences to an aggregation of relative differences.

This concept is further explained in the following, under the assumption that the observed values are formatted as logarithmic transmission, $-\log(I_k/REF_k)$, whereby an absence of touching objects results in an observed value of zero.

In one embodiment, the enhancement is achieved by normalizing each difference in the aggregation of differences by the modulus of the respective observed value, which in a simplified representation may be given as: $\|(P(a)-d)/|d|\|_2^2$ with element-wise normalization. Such an embodiment may require special attention to observed values that are zero, since the normalized difference is undefined for $d_k = 0$.

In another embodiment, the normalization value of each difference in the aggregation of differences is offset by a positive (and non-zero) offset value σ: $\|P((a)-d)/(\sigma+|d|)\|_2^2$ with element-wise normalization. This embodiment automatically allows the observed values to be zero. Further, the use of an offset value σ also enables the impact of measurement noise on the attenuation pattern to be suppressed by proper choice of the offset value σ. Observed values well below the offset value σ will be relatively suppressed by the normalization, whereas observed values at or slightly above the offset value will be included as absolute differences in the aggregation, and observed values well above the offset value will be included as relative differences in the aggregation. An appropriate offset value σ may be determined by routine experimentation for each individual FTIR system, and may e.g. be set to exceed the maximum noise level of the output signal from the light detectors. The offset value may or may not differ between detection lines.

It should be noted that the modulus (i.e. the absolute value) of the observed values d is taken element-wise, such that $|d|$ indicates a set of individual absolute values $|d_k|$. In a more mathematically accurate description, the normalization of the aggregation of differences may be defined as $\|B(P(a)-d)\|_2^2$, where B is a diagonal matrix of the following form:

$$B = \begin{bmatrix} \frac{1}{\sigma+|d_1|} & \cdots & 0 \\ \vdots & \ddots & \vdots \\ 0 & \cdots & \frac{1}{\sigma+|d_k|} \end{bmatrix}.$$

It is to be understood that each normalization operation may implemented as either a division by $(\sigma+|d_k|)$, or a multiplication by $1/(\sigma+|d_k|)$. The skilled person also realizes that there are many alternative ways of calculating the normalization value for each difference, e.g. $\sigma+\sqrt{|d_i|}$, $\sqrt{\sigma+|d_i|}$, $\sigma+(d_i)^2$, $(\sigma+|d_i|)^2$, etc. Any of these examples may be selected to put different emphasis on weak touches versus strong touches. The observed values need not be represented as absolute values in the calculation of the normalization values, but the observed values are preferably represented so as to give a non-negative contribution to the normalization value.

The normalized aggregation may be processed for determination of the attenuation pattern, e.g. according to any of the techniques disclosed in WO2011/049511. For example, by applying Bayes' theorem and one or more priors, the attenuation pattern may be recovered as the maximum a posteriori (MAP) estimate of the total optimization function $F_{total}$.

The skilled person realizes that any suitable optimization method may be used to find the attenuation pattern a that minimizes the total optimization function $F_{total}(a)$, e.g. by causing the gradient $\nabla F_{total}$ to be (close to) zero. The gradient $\nabla F_{total}$ contains the derivatives of the total optimization function for each attenuation value $a_v$, where the individual derivative may be expressed as:

$$\frac{\partial F_{total}}{\partial a_v} = \alpha\frac{\partial F_{total}}{\partial a_v} + \gamma\frac{\partial F_{prior}}{\partial a_v} = \alpha\frac{\partial \mathcal{P}(a)}{\partial a_v}B^T B(\mathcal{P}(a)-d) + \gamma\frac{\partial F_{prior}}{\partial a_v}.$$

It should be noted that if the projection function P is linear and contains only linear operators, it may be possible to minimize $\|B(Pa-d)\|_2^2$ by solving the normal equations. Such an implementation is mainly relevant if the measurement model, $d=Pa+\epsilon$, is over-determined. It is known in the art that the normal equations for $\|B(Pa-d)\|_2^2$ may be formulated as: $((BTP)^T BP)a=(BT)^T Bd$. This equation may be solved analytically by computing the inverse: $a=((BP)^T BP)^{-1}(BT)^T Bd$. In analogy with the description in WO2011/049511, there may be more efficient ways of solving the normal equations, e.g. by Cholesky decomposition or orthogonal decomposition techniques such as QR decomposition. In one example, the Cholesky decomposition is computed once for $R^T R=P^T P$, whereupon the attenuation pattern may be computed for each frame by solving the equation: $R^T B^T BRa=(BP)^T Bd$.

Reverting to the example of FIG. 4B and applying the normalization to the aggregation of differences using $(\sigma+|d_k|)$, with $\sigma=1$, yields the following matrices:

$$\mathcal{P} = \begin{bmatrix} 1 & 0 \\ 0 & 1 \\ 1 & 1 \end{bmatrix}, d = \begin{bmatrix} 51 \\ 1 \\ 49 \end{bmatrix}, B = \begin{bmatrix} 0.0196 & 0 & 0 \\ 0 & 0.5 & 0 \\ 0 & 0 & 0.02 \end{bmatrix}.$$

The attenuation values of the two objects in FIG. 4B may be obtained by solving the normal equations $((BP)^T BP)a=(BT)^T d$, yielding $[a_1=49.44, a_2=0.998]$. Thus, the inventive normalization operates to enable proper identification of both touches.

4. Example of Touch Determination Process

Figure 5A:
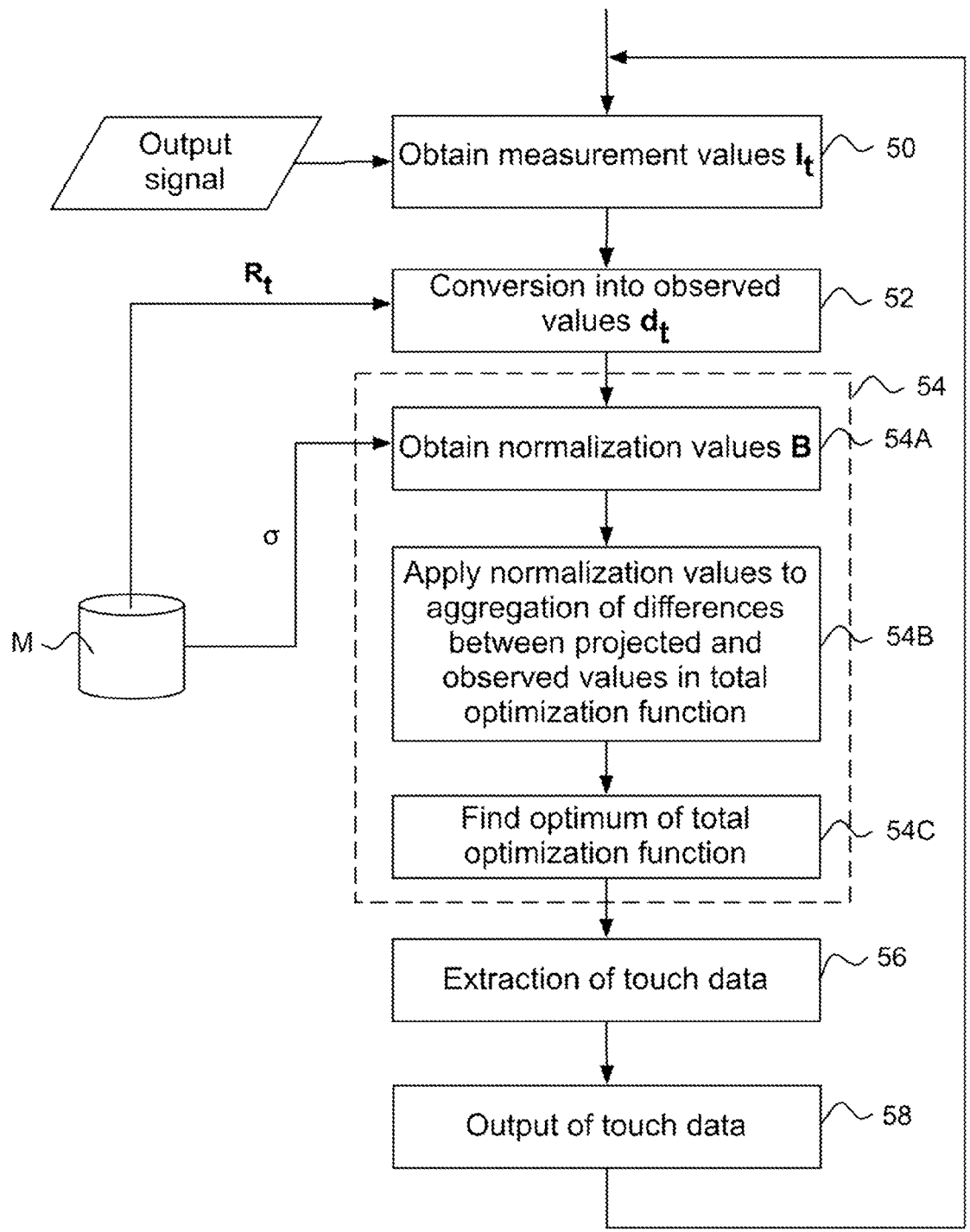
FIG. 5A is a flow chart of a touch determination method.

FIG. 5 illustrates an embodiment of a method for touch data extraction in an FTIR system. The method involves a sequence of steps 50-58 that are repeatedly executed, typically by the data processing device 10 (FIGS. 1A-1B). Each sequence of steps 50-58 forms a "frame".

Each frame starts by a data collection step 50, in which measurement values $I_t$ are sampled from the light sensors in the FTIR system. The data collection results in one measurement value for each detection line. It may be noted that the data may, but need not, be collected for all available detection lines in the FTIR system.

In a conversion step 52, the measurement values $I_t$ are converted into observed values $d_t$ of a desired format, as discussed in Section 2 above. Depending on format, step 52 may involve retrieving current reference values $R_t$ from electronic memory M. The reference values $R_t$ may e.g. be given as $REF_k$ or $\log(REF_k)$.

Any one of steps 50 and 52 may involve additional pre-processing such as filtering for noise reduction and so-called rectification, which may aim at producing observed values for detection lines with an equi-distant or equi-angular distribution on the touch surface.

In a reconstruction step 54, the observed values $d_t$ are processed to generate the most likely distribution of attenuation values ("the attenuation pattern") across the touch surface by evaluating a total optimization function comprising an aggregation of differences between the observed value and a projected value for each of the detection lines. As explained in Section 3, step 54 may involve a sub-step 54A of obtaining a normalization value for each difference in the aggregation of differences (e.g. in the form of a normalization matrix B), a sub-step 54B of applying the normalization values B so as to normalize the individual differences in a total optimization function (with or without priors), and a sub-step 54C of generating the attenuation pattern by minimizing the total optimization function.

Depending on implementation, sub-step 54A may (as shown) involve retrieving the offset value σ from memory M.

Even if step 54 operates to find a solution (i.e. the attenuation pattern $a_t$) that minimizes the total optimization function, the actual processing typically operates on the derivative of the total optimization function. This means that the normalization values are actually applied to the derivative of the total optimization function, but in such a way as to correspond to a normalization of the aggregation of differences. For example, even if step 54 operates on derivatives given by $$\frac{\partial F_{model}}{\partial a_v} = \frac{\partial \mathcal{P}(a_t)}{\partial a_v} B^T B(\mathcal{P}(a_t) - d_t),$$

these derivatives correspond to a total optimization function (probability function) $F_{total}$ that comprises the normalized aggregation of differences given by $\|B(\mathcal{P}(a_t)-d_t))\|_2^2$.

It should also be noted that the optimization problem in step 54 may be solved using any known numerical or analytical algorithm, such as pseudo-inverse, steepest descent, conjugant gradient, Newton-Raphson, quasi-Newton, etc. These and other useful algorithms are further described in, e.g., the book "Numerical Recipes", $3^{rd}$ edition, by Press et al. Another useful variant of the steepest descent algorithm is described in the article "Two-Point Step Size Gradient Methods" by Barzilai and Borwein in IMA Journal of Numerical Analysis 1988 8(1):141-148. Many optimization algorithms are iterative. The number of iterations may be reduced by using the attenuation pattern determined in a preceding frame as the starting point for the optimization in step 54.

The attenuation pattern $a_t$ may be generated within the full touch surface, or within one or more subareas of the touch surface. These subareas may be predetermined, or they may be determined for individual frames by analyzing the observed values, e.g. in analogy with WO2011/049513, which is incorporated herein by reference.

In extraction step 56, the attenuation pattern $a_t$ is processed for identification of touch-related features and extraction of touch data. Any known technique may be used for isolating true (actual) touches within the attenuation pattern. For example, ordinary blob detection and tracking techniques may be used for finding the actual touches. In one embodiment, a threshold is first applied to the attenuation pattern, to remove noise. Any areas with attenuation values that exceed the threshold, may be further processed to find the center and shape by fitting for instance a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, etc. Any available touch data may be extracted, including but not limited to x,y coordinates, areas and shapes of the touches.

In step 58, the extracted touch data is output, and the process returns to the data collection step 50.

It is to be understood that one or more of steps 50-58 may be effected concurrently. For example, the data collection step 50 of a subsequent frame may be initiated concurrently with any of steps 52-58.

Figure 5B:
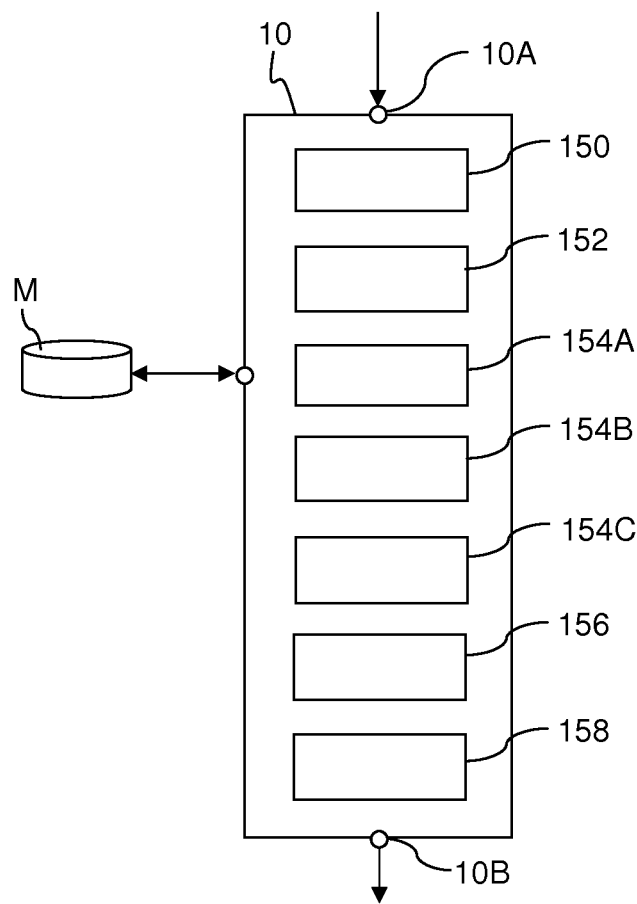
FIG. 5B is a block diagram of a device that implements the method in FIG. 5A.

The touch determination process may be executed by a data processing device (cf. 10 in FIGS. 1A-1B) which is connected to sample the measurement values from the light detectors in the FTIR system. FIG. 5B shows an example of such a data processing device 10 for executing the process in FIG. 5A. The device 10 includes an input 10A for receiving the output signal from the detectors, an element (or means) 150 for obtaining the current measurement values for the detection lines from the output signal, an element (or means) 152 for generating the current observation vector $d_t$ in the appropriate format, an element (or means) 154A for obtaining a normalization value for each difference in an aggregation of differences, an element (or means) 154B for applying the normalization values so as to normalize the individual differences in a total optimization function, an element (or means) 154C for determining a current attenuation pattern $a_t$ by optimizing the total optimization function, an element (or means) 156 for processing the current attenuation pattern $a_t$ for extraction of touch data, and an element (or means) 158 for outputting the touch data via an output 10B.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 14 in FIGS. 1A-1B), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, the offset value σ, pre-defined functions such as $\partial P(a_t)/\partial a_v$ and $P(a_t)$, and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

5. Use of Priors

As indicated above, and thoroughly explained in WO2011/049511, the total optimization function (probability function) may also include an expression $F_{prior}(a)$ defined by one or more priors. Certain priors put constraints on the variations in the attenuation pattern and thus contain an aggregation of differences between attenuation values in the attenuation pattern.

Figure 6:
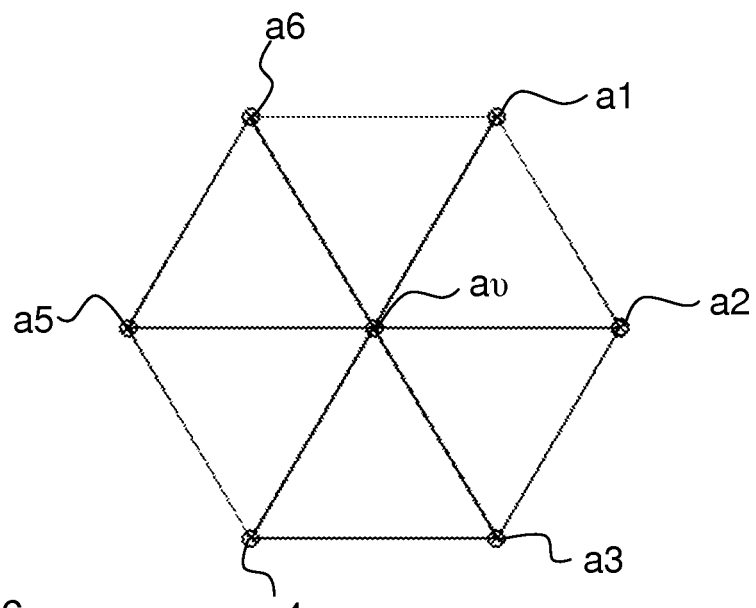
FIG. 6 is a plan view of an attenuation point and its nearest neighbors in an attenuation pattern on a hexagonal grid.

One such prior is the total variation prior, which contains the total sum of absolute differences between neighboring attenuation values:

$$F_{prior}(a) = \Sigma_{n \in N} |a - a_n|,$$

wherein $a_n$ denotes the (nearest) neighbors to each particular position (attenuation value) in the attenuation pattern a, and N is the total number of positions. The modulus of the differences $|a-a_n|$ is taken element-wise, i.e. the sum is an aggregation of absolute values of differences between each of a number of neighbors of each individual position in the attenuation pattern. FIG. 6 illustrates the nearest neighbors $a_1$-$a_6$ to a position $a_v$ for an attenuation pattern associated with a hexagonal grid.

When included in the total optimization function, the total variation prior operates to apply a smoothing to the attenuation pattern. However, the total variation prior puts high penalty on large differences in attenuation between neighboring attenuation values, which means that significantly less smoothing will be applied to weak step changes (e.g. caused by weak touches) compared to strong step changes (e.g. caused by strong touches). In one embodiment, this is overcome by modifying the total variation prior such that the smoothing is relative to the strength of the touches, by normalizing each difference in the aggregation of differences:

$$F_{prior}(a) = \sum_{n \in N} \frac{|a - a_n|}{|a|}.$$

Such an embodiment may require special attention to observed values that are zero, since the normalized difference is undefined when $a_v=0$.

In another embodiment, the normalization value of each difference in the aggregation of differences is offset by a positive value $\sigma_{TV}$:

$$F_{prior}(a) = \sum_{n \in N} \frac{|a - a_n|}{\sigma_{TV} + |a|}.$$

This embodiment automatically allows the attenuation values to be zero, and allows the noise in the attenuation pattern to be suppressed by proper choice of the offset value $\sigma_{TV}$. For example, the offset value $\sigma_{TV}$ may be set to exceed the noise level of the attenuation pattern, e.g. to be equal to the weakest structures to be visualized in the attenuation pattern.

As noted above, the optimization may operate on the derivative of the total optimization function for each attenuation value $a_v$. To obtain this derivative, the absolute values ($|a_v|$) may be represented by a suitable continuous function, e.g. as disclosed in WO2011/049511. In such an example, the derivative or gradient of $F_{prior}(a)$ may be expressed as:

$$\frac{\partial F_{prior}}{\partial a_v} = \sum_{n \in N_v} \frac{1}{\sigma_{TV} + |a_v|} \cdot \left( \frac{\sinh(\tau \cdot (a_v - a_n))}{\cosh(\tau \cdot (a_v - a_n))} - \frac{1}{\tau} \frac{\log(\cosh(\tau \cdot (a_v - a_n)))}{\sigma_{TV} + |a_v|} \right).$$

The skilled person realizes that the total variation prior may be normalized in other ways to achieve the desired smoothing. Another example is:

$$F_{prior}(a) = \sum_{n \in N} \frac{|a - a_n|}{\sigma_{TV} + \frac{1}{2}|a + a_n|},$$

in which the normalization value for a difference in attenuation between one position and a neighboring position is given by the average of the attenuation values at these positions (plus the offset value $\sigma_{TV}$).

Like the normalization of $F_{model}(a)$ in Section 3, the modulus of the attenuation values is taken element-wise, such that $|a|$ (or $|a+a_n|$) represents a set of individual absolute values $|a_v|$ (or $|a_v+a_n|$). Thus, in all embodiments, the prior is normalized by an estimate of the local attenuation at the individual attenuation value $a_v$.

There are numerous alternatives to the total variation prior. In as much as the prior(s) include an aggregation of differences, the foregoing principles of normalization are equally applicable. For example, the conventional neighboring L2 smoothness prior contains an aggregation of differences: $\Sigma_{n \in N} \|a-a_n\|_2^2$, which may be normalized in analogy with the total variation prior.

It is known in the art that the total optimization function may include still further priors, e.g. a positivity prior that stipulates that all attenuation values are positive, provided that this is a known or desired property of the attenuation pattern.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the reconstruction process need not generate an attenuation pattern, i.e. a distribution of attenuation values on the touch surface. Rather, the reconstruction process may be designed to generate any form of interaction pattern that represents interaction by positive or negative peaks. Such an interaction pattern contains a two-dimensional distribution of interaction values in any format. In the specific examples given in Sections 2-5, the interaction pattern is an attenuation pattern that indicates changes in attenuation with respect to an earlier time point, which is either a calibration time point (FIG. 2) or a preceding frame (FIGS. 3A-3B). Thereby, in these examples, the observed values represent attenuation (logarithmic transmission) and are zero (0) in the absence of any changes in interaction on the touch surface. However, it has already been noted that the observed values may be given in many different formats, and that the projection function is designed to generate the projected values in the same format as the observed values. As noted in Section 2, the observed values may instead indicate transmission, e.g. $d_k=I_k/REF_k$, such that they are one (1) in the absence of any changes interaction on the touch surface. With such a format of the observed values, the normalization of the aggregation of differences between the observed values $d_t$ and the projected values $P(a_t)$ may be modified for optimum performance, to account for the fact that the projected values $P(a_t)$ are non-zero in the absence of changes in interaction on the touch surface. In one embodiment, the modulus of the observed value ($|d_k|$) in the calculation of normalization values is substituted for a "nominal difference". The nominal difference is given by the modulus of the difference between the observed value and a nominal projected value which is obtained when there are no changes in interaction on the touch surface. This may be expressed as: $|P(a_{REF})_k - d_k|$, where $a_{REF}$ is the interaction pattern that is obtained when there are no changes in interaction on the touch surface. When the observed values indicate attenuation, all nominal projected values are 0 (no interaction change), and the nominal difference is $|d_k|$, in accordance with the description in Section 3. In the example that the observed values indicate transmission, all nominal projected values are 1 (no interaction change) and the nominal difference is $|1-d_k|$. Thus, in this example, each normalization value is computed as a function of $|1-d_k|$ instead of $|d_k|$. This will properly modify the likelihood distribution to enhance the differences for weak touches compared to strong touches. It should be understood that all variants of using $|d_k|$ for normalization as discussed in Section 3 are equally applicable when using the nominal difference for normalization, including variants for obtaining the normalization value as a function of the nominal difference, including the addition of an offset value σ. It should be emphasized that the calculation of normalization values using the nominal difference is valid for all formats of the observed values, not only formats representing attenuation and transmission.

The invention claimed is:

1. A method of enabling touch determination based on an output signal from a touch-sensitive apparatus, the touch-sensitive apparatus including a panel configured to conduct signals from a plurality of incoupling points to a plurality of outcoupling points, thereby defining detection lines that extend across a surface portion of the panel between pairs of incoupling and outcoupling points, the touch-sensitive apparatus further including at least one signal generator coupled to the plurality of incoupling points to generate the signals, and at least one signal detector coupled to the plurality of outcoupling points to generate the output signal, the output signal indicative of interaction between one or more touching objects and one or more of the detection lines, wherein the method comprises:
processing the output signal to obtain observed values for a plurality of the detection lines;
for each of the plurality of the detection lines
computing a normalization value for the detection line as a function of the observed value for the detection line,
generating a projected value for the detection line based on a projection function that defines a functional relation between a fitted interaction pattern and the projected value for the detection line,
calculating a difference value between the observed value for the detection line and the projected value for the detection line,
computing a normalized difference value for the difference value based on the normalization value for the detection line,
updating the fitted interaction pattern based on an optimization function to minimize the normalized difference value; and
processing the fitted interaction pattern to determine touch interaction.

2. The method of claim 1, wherein
the normalization value for the detection line is computed to be relatively larger when the observed value for the detection line corresponds to a first interaction as compared to a second interaction;
the first interaction corresponds to a first touch and the second interaction corresponds to a second touch; and
the first interaction is stronger than the second interaction.

3. The method of claim 1, wherein
the fitted interaction pattern is indicative of changes in interaction on the surface portion; and
the computing a normalization value for a detection line includes
computing the normalization value as a function of a nominal difference between the observed value for the detection line and a nominal projected value for the detection line, the nominal projected value determined based on the projection function when the fitted interaction pattern indicates that there are no changes in interaction on the surface portion.

4. The method of claim 3, wherein the computing a normalization value for a detection line further comprises:
computing the normalization value as a function of a positive offset value and the nominal difference.

5. The method of claim 4, wherein the computing the normalization value as a function of a positive offset value and the nominal difference comprises:
adding the positive offset value to a non-negative value obtained as a function of the nominal difference.

6. The method of claim 4, further comprising:
setting the positive offset value to exceed an estimated noise level of the output signal.

7. The method of claim 1, wherein the updating the fitted interaction pattern comprises:
finding a fitted interaction pattern that causes a gradient of the optimization function for each interaction value in the fitted interaction pattern to be substantially zero.

8. The method of claim 7, wherein the optimization function comprises:
a first part representing a likelihood distribution, the likelihood distribution being a function of an aggregation of the normalized difference values for the plurality of the detection lines; and
a second part representing a prior distribution, the prior distribution configured to penalize variations between neighboring interaction values in the fitted interaction pattern.

9. The method of claim 8, wherein
the prior distribution is a function of an aggregation of second difference values between each interaction value in the fitted interaction pattern and neighboring interaction values in the fitted interaction pattern; and
each of the second difference values is normalized by a second normalization value that represents a local interaction strength at said individual interaction value.

10. The method of claim 9, wherein the local interaction strength is a function of said interaction value.

11. The method of claim 9, wherein the second normalization value is computed by adding a positive second offset value to the local interaction strength.

12. The method of claim 11, wherein the positive second offset value is set to exceed an estimated noise level in the fitted interaction pattern.

13. The method of claim 1, wherein the processing the output signal comprises:

identifying a measurement value for each of the plurality of the detection lines; and generating the observed value for each of the plurality of the detection lines, the observed value representing a relative change of the measurement value to a reference value for the detection line.

14. The method of claim 13, wherein the observed value is generated as a logarithm of the relative change.

15. The method of claim 13, wherein the reference value for the detection line is a function of the measurement value for the detection line at a calibration time without said interaction between said one or more touching objects and said one or more of the detection lines.

16. The method of claim 13, wherein
the method operates in a sequence of repetitions to identify the measurement value for each of the plurality of the detection lines, generate the observed values for the plurality of the detection lines, and estimate the fitted interaction pattern; and the method further includes intermittently updating the reference value for the detection line based on the output signal such that the fitted interaction pattern indicates changes in interaction with respect to a preceding repetition in the sequence of repetitions.

17. The method of claim 1, wherein the fitted interaction pattern is representative of changes in one of attenuation and transmission.

18. A non-transitory computer-readable medium storing computer code that, when executed on a data-processing system, causes the data-processing system to perform the method of of claim 1.

19. A device for enabling touch determination based on an output signal from a touch-sensitive apparatus, the touch-sensitive apparatus including a panel configured to conduct signals from a plurality of incoupling points to a plurality of outcoupling points, thereby defining detection lines that extend across a surface portion of the panel between pairs of incoupling and outcoupling points, the touch-sensitive apparatus further including at least one signal generator coupled to the plurality of incoupling points to generate the signals, and at least one signal detector coupled to the plurality of outcoupling points to generate the output signal, the output signal indicative of interaction between one or more touching objects and one or more of the detection lines, said device comprising:

a signal processor configured to
process the output signal to obtain observed values for a plurality of the detection lines;

for each of the plurality of the detection lines
compute a normalization value for the detection line as a function of the observed value for the detection line, generate a projected value for the detection line based on a projection function that defines a functional relation between a fitted interaction pattern and the projected value for the detection line, calculate a difference value between the observed value for the detection line and the projected value for the detection line, compute a normalized difference value for the difference value based on the normalization value for the detection line, update the fitted interaction pattern based on an optimization function to minimize the normalized difference value; and process the fitted interaction pattern to determine touch interaction.

20. A touch-sensitive apparatus, comprising:

a panel configured to conduct signals from a plurality of incoupling points to a plurality of outcoupling points, thereby defining detection lines that extend across a surface portion of the panel between pairs of incoupling and outcoupling points;

at least one signal generator configured to generate the signals at the plurality of incoupling points;

at least one signal detector configured to generate an output signal based on detected signals at the plurality of outcoupling points; and a signal processor coupled to the at least one signal detector, the signal processor configured to
process the output signal to obtain observed values for a plurality of the detection lines, for each of the plurality of the detection lines
compute a normalization value for the detection line as a function of the observed value for the detection line, generate a projected value for the detection line based on a projection function that defines a functional relation between a fitted interaction pattern and the projected value for the detection line;

calculate a difference value between the observed value for the detection line and the projected value for the detection line, compute a normalized difference value for the difference value based on the normalization value for the detection line, update the fitted interaction pattern based on an optimization function to minimize the normalized difference value, and process the fitted interaction pattern to determine touch interaction.

\* \* \* \* \*